UNITED STATES PATENT OFFICE.

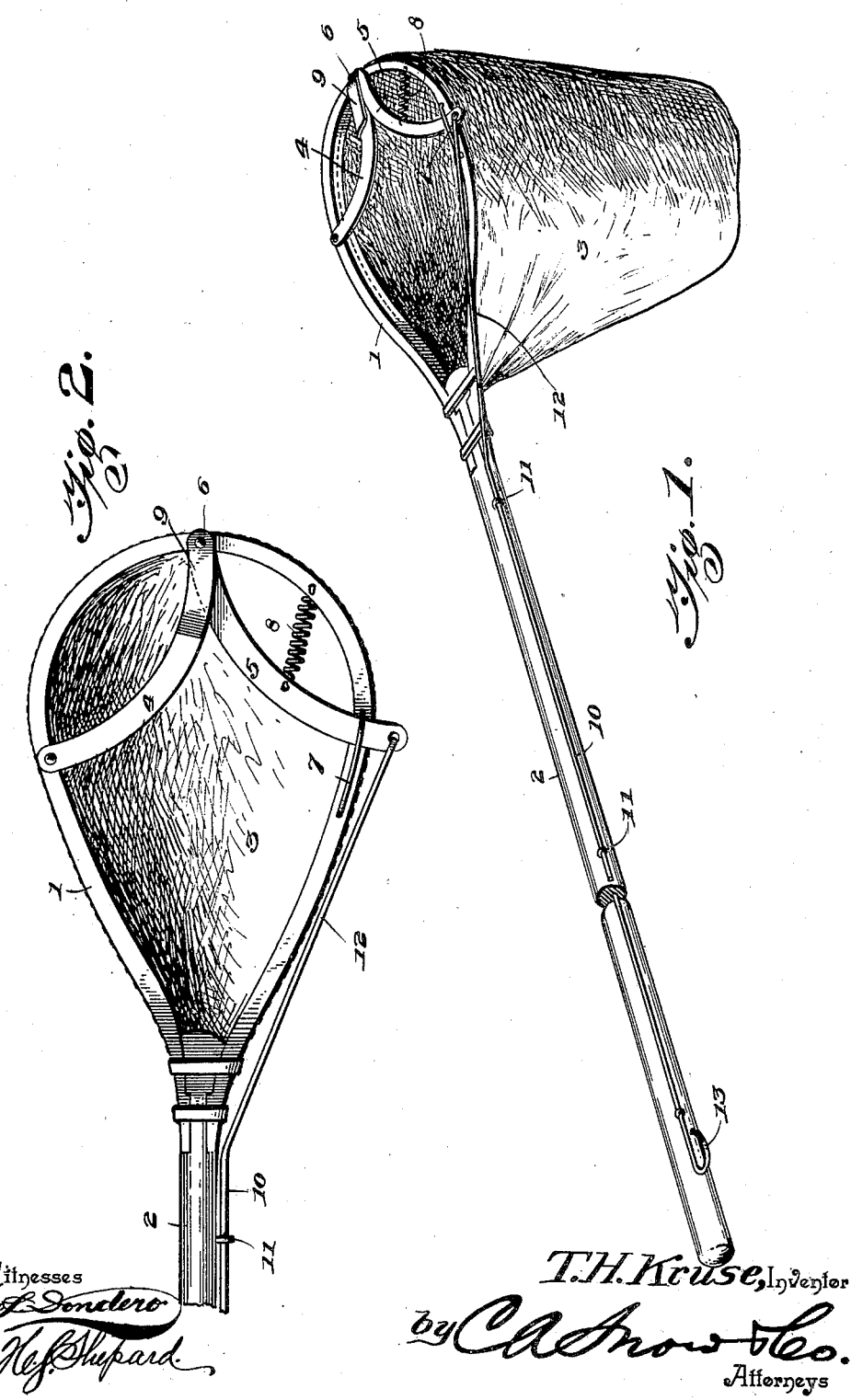

THEODORE H. KRUSE, OF MONTROSE, COLORADO, ASSIGNOR OF ONE-HALF TO HENRY C. FINK, OF SAME PLACE.

FRUIT-PICKER.

SPECIFICATION forming part of Letters Patent No. 679,320, dated July 30, 1901.

Application filed March 18, 1901. Serial No. 51,722. (No model.)

*To all whom it may concern:*

Be it known that I, THEODORE H. KRUSE, a citizen of the United States, residing at Montrose, in the county of Montrose and State of Colorado, have invented a new and useful Fruit-Picker, of which the following is a specification.

This invention relates to fruit-pickers, and has for its object to provide an improved device of this character which is arranged to effectively cut the stems of the fruit, so as to avoid pulling the fruit from the limbs of the trees, as such an action damages both the fruit and the limbs. It is furthermore designed to arrange the cutting apparatus so as to be operated from the lower end of the device and also to have said apparatus form a brace for the frame which carries the bag or receptacle for containing the picked fruit.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a fruit-picker constructed in accordance with the present invention. Fig. 2 is a detail plan view of the bag-frame and the cutting apparatus.

Like characters of reference designate corresponding parts in both figures of the drawings.

Referring to the drawings, 1 designates a marginal bag-frame having a handle 2 of suitable length connected thereto and also provided with a bag or like receptacle 3, hung from the frame.

The cutting apparatus is formed in two members 4 and 5, which are in the form of arcuate knives, having their convex cutting edges arranged to produce a shear cut. The knife member 4 is stationary and has its opposite ends connected to the upper side of the bag-frame by means of the terminal fastenings 6, one end of the knife being in alinement with the handle of the device. The other knife member is pivotally mounted upon the common fastening 6 at the outer ends of the members, and its rear end is projected transversely across and outwardly beyond the bag-frame intermediately of the outer and inner ends of said frame and substantially opposite the fixed inner end of the former knife member 4. The rear end of the pivotal member is free and plays within a suitable guard—as, for instance, a staple-shaped fastening 7, driven into the upper side of the bag-frame and straddling the free end of the member. A coiled spring 8 has its opposite ends connected to the bag-frame and the intermediate portion of the concaved back of the pivotal knife member, so as to yieldably hold the latter at its outer limit and against the outer side of the guard 7. At the point where the two knife members overlap the back edge of the stationary member is folded over upon the top thereof, as at 9, so as to overlap the adjacent portion of the other member, and thereby form a guard to prevent lateral separation of the knife members when cutting a stem.

For convenience in manipulating the cutting apparatus there is provided an operating-rod 10, which is slidably mounted upon the handle by means of suitable eyes or guides 11, that are driven into the handle and slidably receive the rod. The outer end of the rod is bent or deflected laterally outward, as at 12, so as to lie at the outer side of the bag-frame, and is connected to the outer free end of the pivotal knife member. The opposite end of the rod is formed into or provided with a suitable hand-grasp or handle 13, whereby the rod may be moved in an endwise direction, and thereby draw the pivotal knife toward the fixed knife to sever a stem which has been previously received in the interval between the two knives.

It will be observed that the knives have their outer ends connected to the middle of the outer end portion of the bag-frame and their inner ends connected to the intermediate portions of the opposite side portions of the frame, thereby forming a brace therefor without obstructing the entrance into the bag.

What is claimed is—

1. A fruit-picker, having a marginal bag-frame a handle therefor, a bag suspended from the frame, opposite knife members mounted upon the frame, one of the members having its opposite ends fixedly connected to the outer end of the frame and the intermediate portion thereof, respectively, the other knife member having its outer end pivotally mounted upon the outer terminal fastening of the former member, and its inner end loosely resting upon the intermediate portion of the frame opposite the former member, a staple-shaped guard driven into the frame and straddling the free end of the pivotal knife member, and operating means connected to the free end of the pivotal knife member and leading to or adjacent to the outer end of the handle.

2. A fruit-picker, having a marginal bag-frame and a cutting apparatus, comprising opposite knife members, one of which is fixed, and the other is pivotally mounted to coöperate with the fixed member, and the latter having a portion of its back edge folded over upon the top thereof and overlapping the pivotal member to form a guard therefor.

3. A fruit-picker, having a marginal bag-frame an arcuate fixed knife having its outer end fixedly connected to the outer end of the frame and its rear end connected to the intermediate portion of one side of the frame, an opposite arcuate movable knife member having its outer end pivotally mounted upon the outer terminal fastening of the former member, and its rear end lying loosely upon the intermediate portion of the frame opposite the rear end of the former member, the convex edges of the members being sharp and arranged for coöperation to produce a shear cut, said members also forming a brace for the frame, a guard for the free end of the pivotal knife member, a spring connected at its opposite ends to the back of the pivotal knife and the adjacent portion of the frame, the back edge of the stationary knife member being folded over to overlap the movable member and form a guard therefor, and an operating device connected to the free end of the movable knife member.

In testimony that I claim the foregoing as my own I have hereto affixed my signature in the presence of two witnesses.

THEODORE H. KRUSE.

Witnesses:
H. W. CHRISTOPHER,
J. L. ATKINSON.